United States Patent [19]

McMaster et al.

[11] Patent Number: 5,045,103

[45] Date of Patent: * Sep. 3, 1991

[54] APPARATUS FOR HEATING AND BENDING GLASS SHEETS

[75] Inventors: Harold A. McMaster, Woodville, Ohio; Ben M. Balestra, Temperance, Mich.

[73] Assignee: Glasstech, Inc., Perrysburg, Ohio

[ * ] Notice: The portion of the term of this patent subsequent to Sep. 18, 2007 has been disclaimed.

[21] Appl. No.: 557,978

[22] Filed: Sep. 4, 1990

Related U.S. Application Data

[63] Continuation of Ser. No. 367,849, Jun. 19, 1989, Pat. No. 4,957,531, which is a continuation-in-part of Ser. No. 249,718, Sep. 27, 1988, Pat. No. 4,883,527, which is a continuation of Ser. No. 83,675, Aug. 7, 1987, Pat. No. 4,822,398.

[51] Int. Cl.$^5$ .......................................... C03B 23/023
[52] U.S. Cl. ........................................ 65/273; 65/162; 65/287
[58] Field of Search .................. 65/106, 273, 287, 162

[56] References Cited

U.S. PATENT DOCUMENTS 3,960,535 6/1976 Hamilton et al. ..................... 65/273
4,483,703 11/1984 Kellar et al. ........................... 65/273

Primary Examiner—Joye L. Woodard
Attorney, Agent, or Firm—Brooks & Kushman

[57] ABSTRACT

An apparatus for heating and bending quenching glass sheets (10) is disclosed as including a first platen (14) and a second platen (22). Both platens (14,22) are deformable for heating and bending a heated glass sheet (12) therebetween. First heat source (18) is integral with the first platen (14) and provides heat in close proximity to the heated glass sheet (12) during the bending to maintain an optimal glass bending temperature.

19 Claims, 5 Drawing Sheets

APPARATUS FOR HEATING AND BENDING GLASS SHEETS

CROSS-REFERENCE TO RELATED APPLICATION

This application is a continuation of application Ser. No. 367,849 filed June 14, 1989, now U.S. Pat. No. 4,957,531, which is a continuation-in-part of application Ser. No. 249,718 filed Sept. 27, 1988, now U.S. Pat. No. 4,883,527 which is a continuation of application Ser. No. 083,675 filed Aug. 7, 1987, now U.S. Pat. No. 4,822,398 all of which are hereby incorporated by reference.

TECHNICAL FIELD

This invention relates to an apparatus for heating and bending glass sheets.

BACKGROUND ART

During conventional bending of heated glass sheets, wherein the glass sheet is bent after being heated in a glass sheet heating furnace, maintaining a sufficient glass temperature for optimal processing is difficult.

If the temperature of the heated glass sheet falls off before and/or during the bending, premature cooling sets up stresses which inhibit bending and sometimes cause the glass sheet to break during bending.

DISCLOSURE OF INVENTION

An object of the present invention is to provide an apparatus for heating and bending glass sheets at one station that maintains an optimal glass bending temperature necessary for producing a high yield of bent glass sheets.

Another object of the invention is to provide an apparatus that has a movable heat source that moves with the surfaces of the flat glass sheet to provide equal thermal conditions across the glass sheet surfaces while maintaining the optimal bending temperature during the bending.

A further object of the invention is to provide an apparatus that has more flexibility and that can form glass sheets into complicated configurations and can bend glass sheets of different thicknesses.

In carrying out the above objects and other objects of the invention, the glass heating and bending apparatus constructed in accordance with the invention comprises a first platen. The first platen is deformable and includes an actuator for deforming the platen from a planar shape to a bent shape. The first platen also includes a first heating means throughout the extent thereof. The first heat source and quench openings of the first platen is movable with the platen during the deformation of the platen. The first heating means provides heat in close proximity to the heated glass sheet during the bending to maintain an optimal glass bending temperature. A second platen opposes the first platen in a spaced relationship with the glass sheet therebetween.

The glass heating and bending apparatus includes a sensor for sensing the temperature of the heated glass sheet prior to the bending. Preferably, such a sensor is an infrared spectrafotometer. Most preferably, the sensor is an IRCON sensor. In a preferred embodiment of the invention, a control in communication with the sensor regulates the operation of the first heating means.

In a preferred embodiment of the invention, the first heating means is located adjacent the glass sheet on the surface that is stretched during the bending. In such positioning, the first heating means is generally located less than one inch from the surface being heated.

Alternately, the second platen includes a second heating means for heating the glass sheet. In such an embodiment, a control is in communication with the temperature sensor for regulating the operation of the first and second heating means. Like the first heating means, the second heating means is located adjacent the glass sheet, thereby providing heat on the side of the glass sheet that is opposite that being heated by the first heating means. The second heating means is located generally less than one inch from the surface being heated.

In a first embodiment of the invention, the heating means is an electrical resistance heating element including a control circuit connected to the heating element and, also, a temperature sensor connected to the control circuit.

In a second embodiment of the invention, the heating means is a heat pipe including a housing forming a sealed chamber having heating fluid contained within the sealed chamber, and a control for controlling the thermal conductance of the heat pipe.

In a third, most preferred, embodiment of the invention, the heating means is a burner, including a flame opening. Such an apparatus further includes a combustible gas supply system communicating combustible gas to the flame opening. The first platen therein is comprised of a plurality of tubes extending longitudinally with respect to a path of glass sheet travel. Each of the tubes includes a chamber communicating combustible gas to the flame opening.

The above object and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
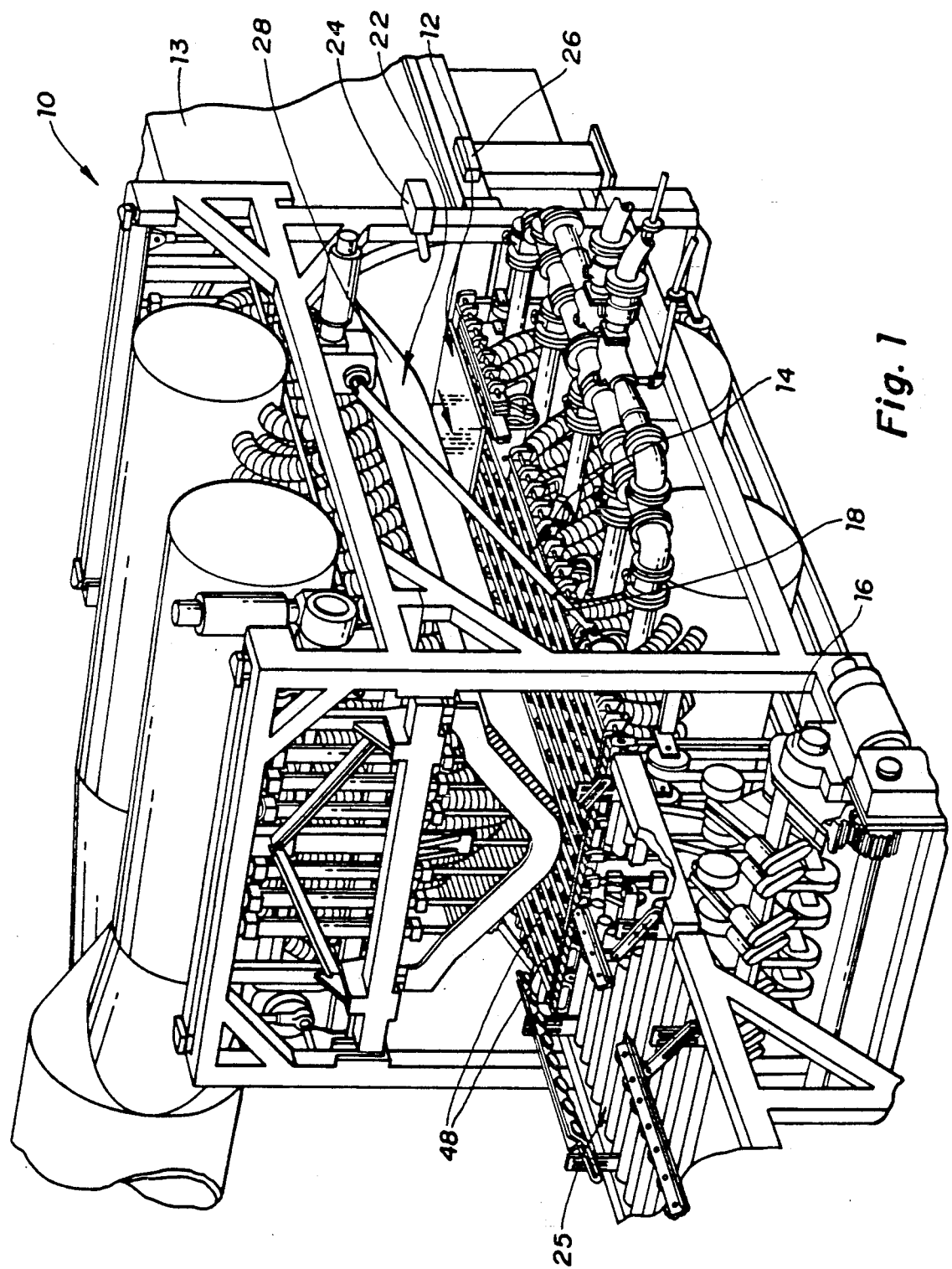
FIG. 1 is a perspective view of a glass sheet heating, and bending apparatus constructed in accordance with the present invention and illustrated with a pair of opposed heating and bending platens in a position for receiving a heated glass sheet being indexed therebetween the platens.

Referring to FIG. 1 of the drawings, a glass heating and bending apparatus constructed in accordance with the present invention is generally indicated by reference numeral 10 and is used to heat and bend a heated glass sheet 12. As is hereinafter more fully described, the heating and bending apparatus maintains an optimal glass sheet bending temperature during the bending to thereby improve the yield and improve mechanical characteristics of the quenched bent glass sheet.

As shown in FIG. 1, the glass heating, and bending apparatus 10 comprises a first platen 14 for receiving the heated glass sheet 12 to be bent. The first platen 14 is deformable and includes an actuator 16 for deforming the platen from a planar shape to a bent shape. The first platen 14 includes a first heating means 18 and quench openings 20 throughout the extent of the first platen 14, shown in more detail in FIGS. 2-4. First heating means 18 is operable for providing heat in close proximity to the heated glass sheet 12 during the bending to maintain an optimal glass bending temperature. The optimal glass bending temperature, theoretically achieved in an adjacent glass heating furnace 13, is maintained as the application of heat to the glass sheet 12 by the heating means 18 reduces the rate of cooling of the glass sheet outside the furnace.

A second platen 22 also has quench openings throughout the extent of the second platen. The second platen 22 opposes the first platen 14 in spaced relationship with the glass sheet 12 therebetween. Actuator 16 is operable for deforming the first platen 14 for bending the glass sheet 12 between the platens. Quenching gas can be supplied to the quench openings 20 of both platens 14, 22 and thereby to both sides of the glass sheet 12 to temper the bent glass sheet between the platens. Otherwise, if a glass sheet to be annealed is bent, the quench openings 20 are not utilized. A detailed discussion of the operation of the apparatus 10 is provided in the copending applications to the herein disclosed invention and are incorporated herein by reference.

With continued reference to FIG. 1, a sensor 24 is provided for sensing the temperature of the heated glass sheet 12 between the platens prior to and during the bending. If the temperature sensed by the sensor 24 is in an acceptable temperature range prior to the bending, such that the already heated glass sheet can be brought up to or maintained at the optimal bending temperature, that glass sheet will be bent. If the glass sheet 12 temperature sensed by sensor 24 is unacceptably low, that glass sheet will be exited from between the platens 14, 22 onto a run-out table 25 without bending to avoid potential breakage of the glass sheet. Preferably, sensor 24 is an infrared spectrophotometer. Most preferably, the spectrophotometer is an IRCON sensor.

With continued reference to FIG. 1, the heating, and bending apparatus 10 includes a control 26 in communication with sensor 24 for regulating the operation of the first heat source 18. Preferably, the first heating means 18 is located adjacent the glass sheet 12 on the surface of the glass sheet that is stretched during the bending. The first heating means 18 is preferably located less than one inch from the surface of the glass sheet 12 being heated so that a uniform temperature can be maintained throughout the glass sheet. Also, in this arrangement, heat is being concentrated on the glass sheet 12 and not the surrounding machinery.

Preferably, the second platen 22 includes a second heating source 28 also for heating the glass sheet 12. In this preferred embodiment, sensor 24 senses the temperature of the heated glass sheet 12 and is in communication with both first and second heating means 18, 28.

Preferably, the second heating means 28 is located adjacent the glass sheet 12, thereby providing heat on the other side of the glass sheet that is opposite that side being heated by the first heating means 18. As is the first heating means 18, the second heating means 28 is preferably located less than one inch from the surface of the glass sheet 12 being heated.

Figure 2:
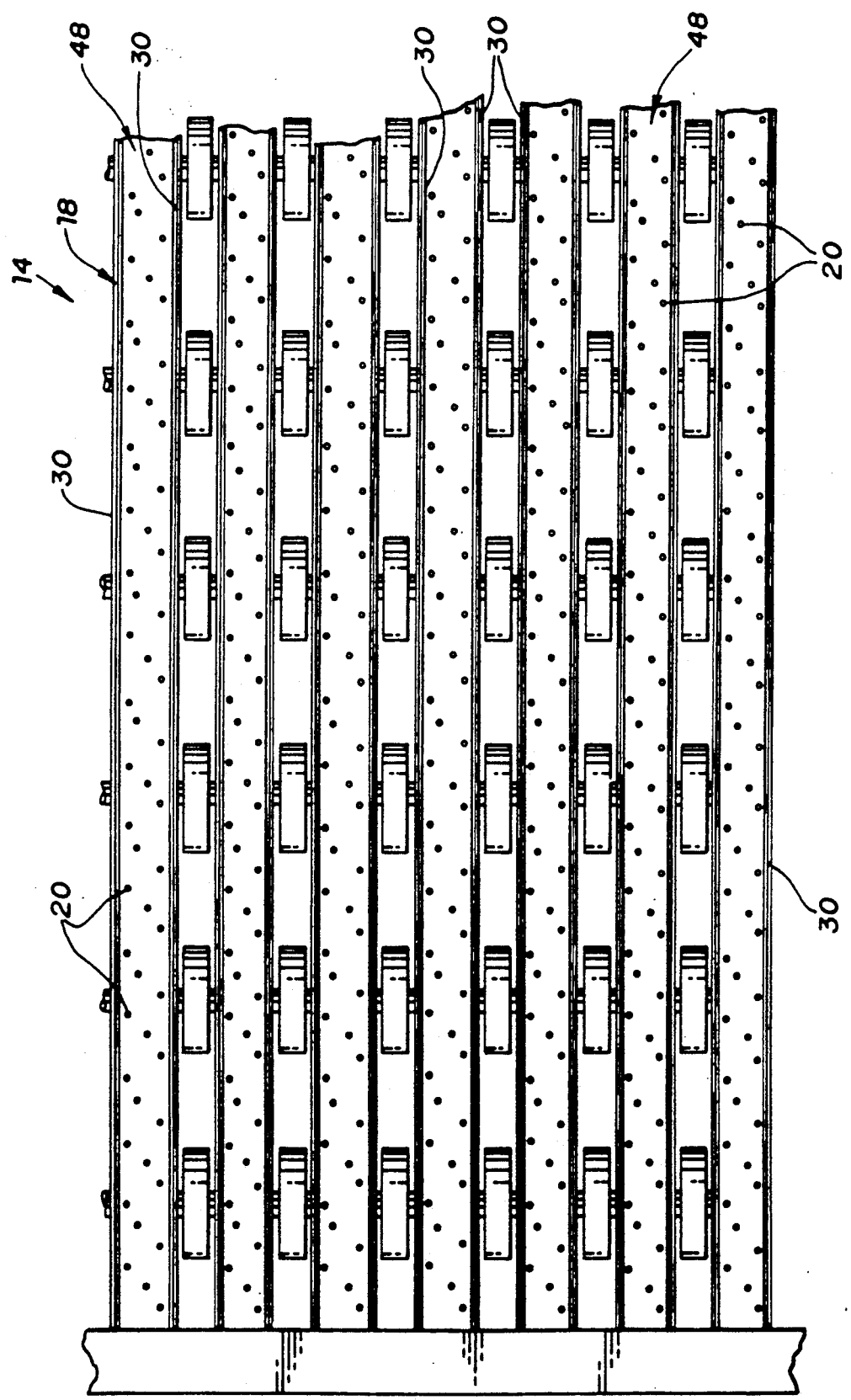
FIG. 2 is a partial plan view of a lower heating and bending platen constructed in accordance with a first embodiment of the invention wherein electric heating elements are utilized.

In one embodiment of the invention, shown by general reference to a first platen 14 in FIG. 2, heating means 18 are electrical resistance heating elements 30. Heating elements 30 include a control circuit connected to the heating elements, and temperature sensor 24 is connected to the control circuit through which control 26 energizes the heating elements to heat glass sheet 12 to maintain the optimal bending temperature.

Figure 3:
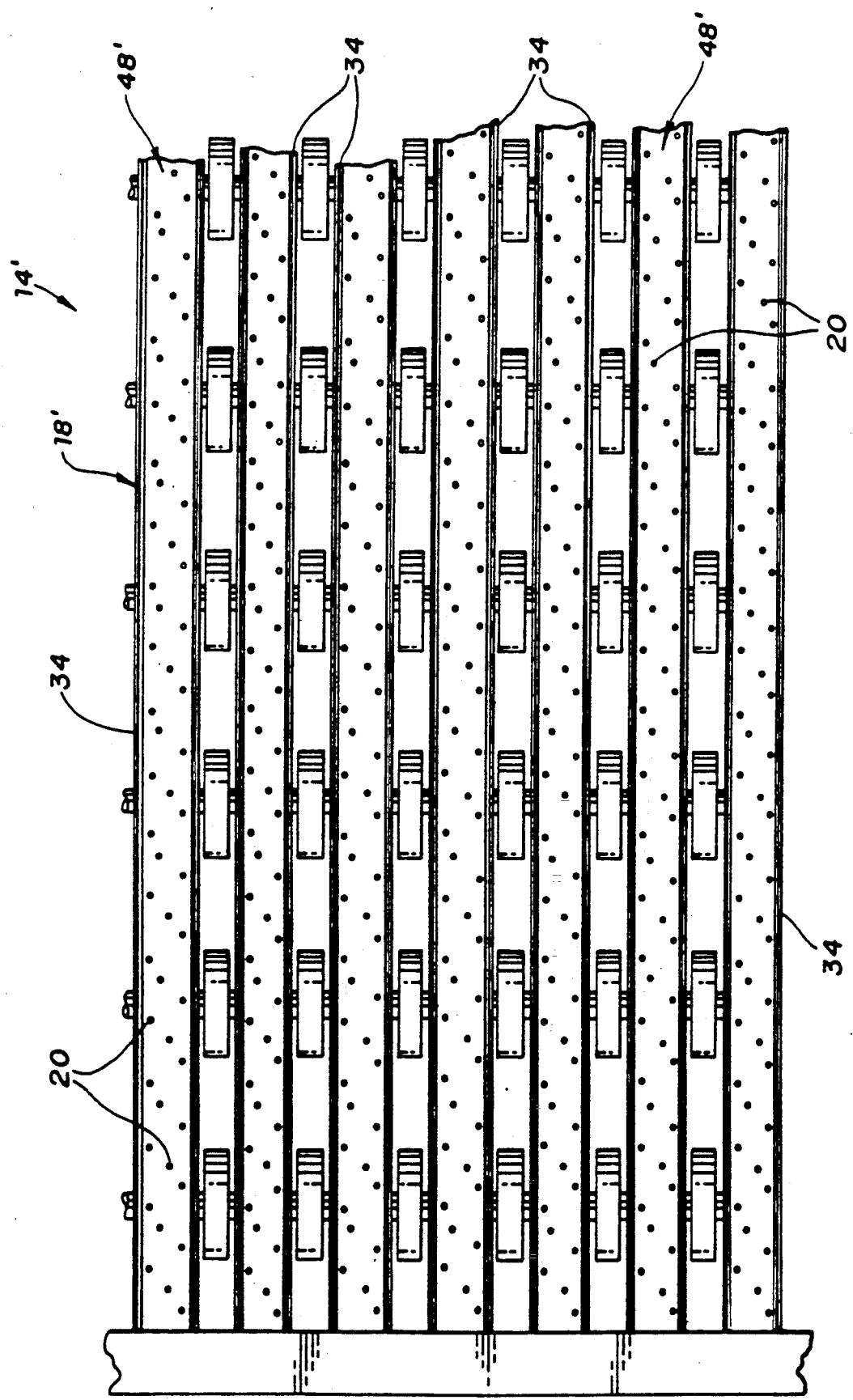
FIG. 3 is a partial plan view of a lower heating and bending platen constructed in accordance with a second embodiment of the invention wherein heat pipes are utilized.

In a second embodiment of the invention, shown by general reference to a first platen 14 in FIG. 3, heating means 18 are heat pipes 34 including a housing forming a sealed chamber. Heating fluid is contained within the sealed chamber and a control controls the thermal conductance of the heat pipe 34. The heating fluid is contemplated to include combustion by-products created during the heating of glass sheet 12 in the glass heating furnace prior to introduction into the glass heating and bending apparatus 10.

Figure 4:
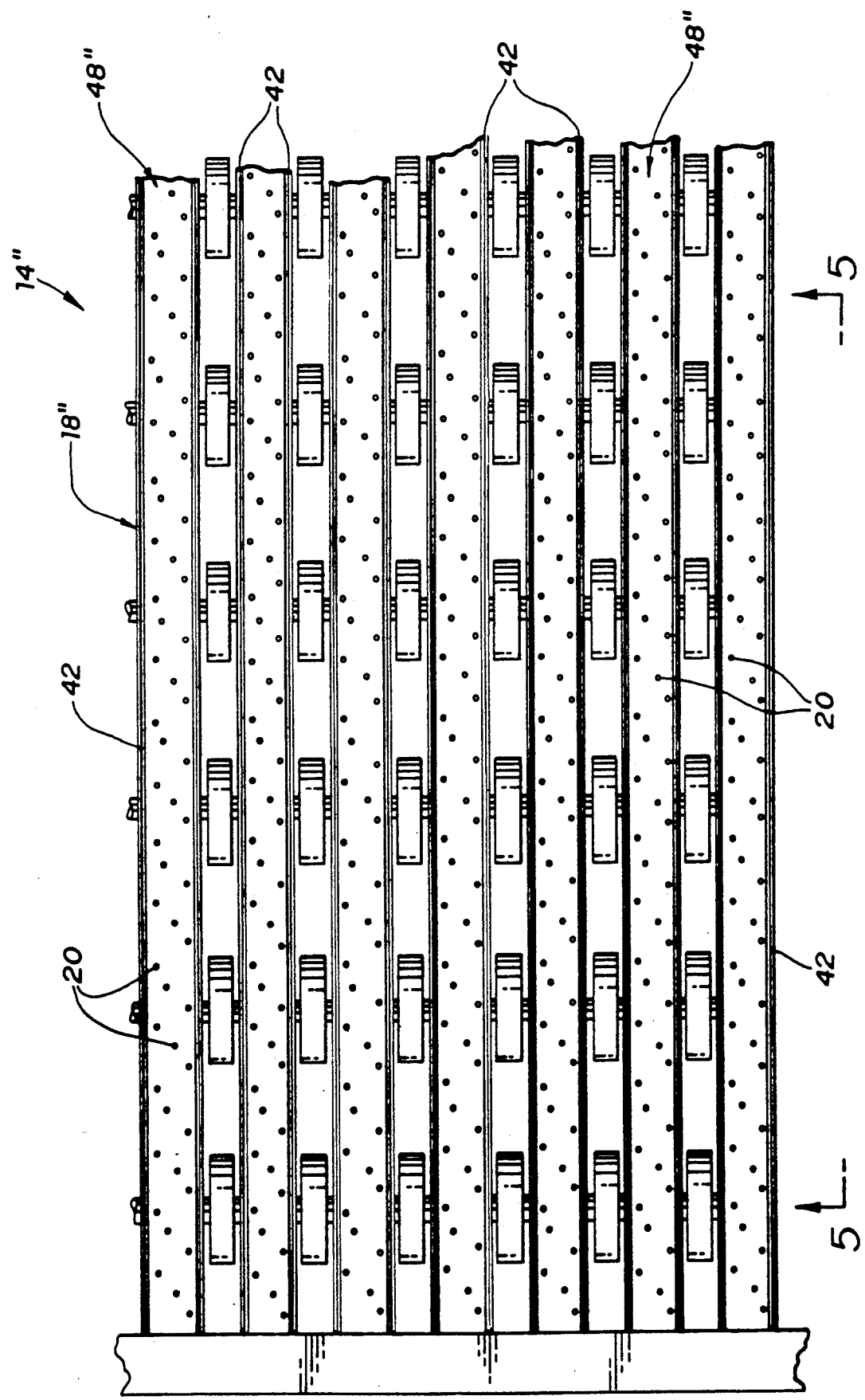
FIG. 4 is a partial plan view of a lower heating and bending platen constructed in accordance with a third embodiment of the invention wherein flame burners are utilized.
Figure 5:
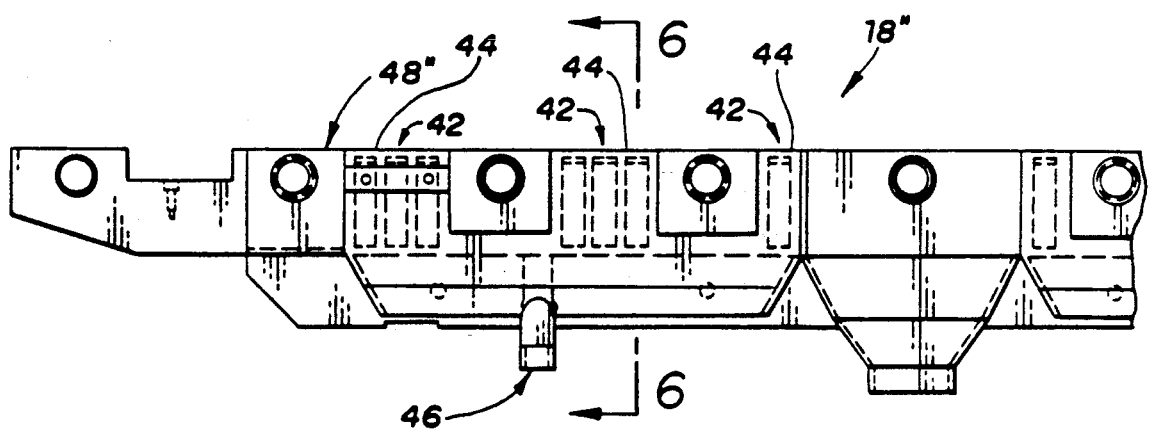
FIG. 5 is a partial side view of a combination heating and quenching tube illustrated in FIG. 4.
Figure 6:
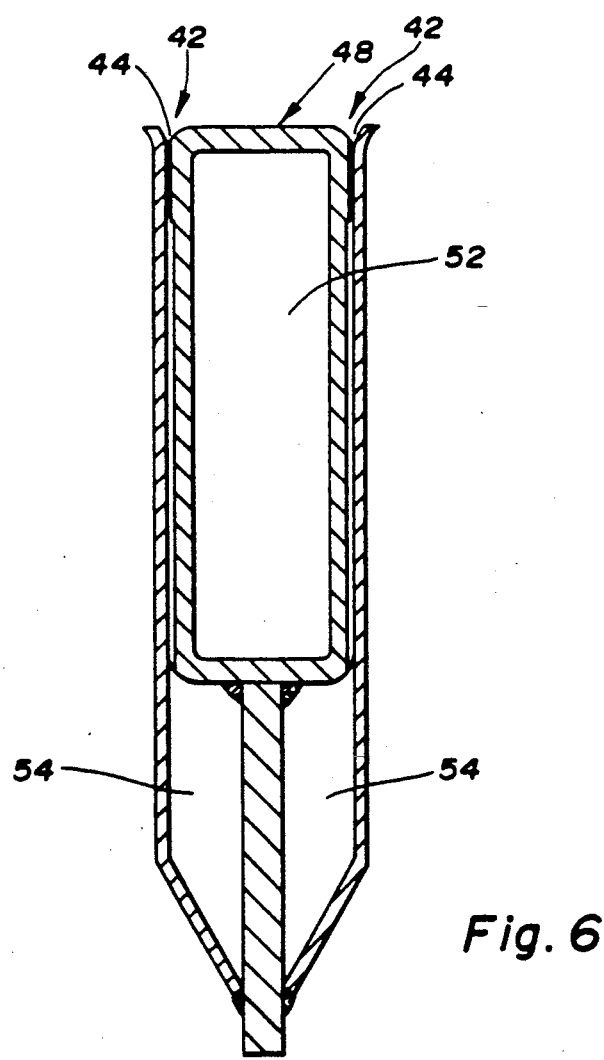
FIG. 6 is a sectional view taken along lines 4—4 in FIG. 3 illustrating first and second chambers of said tube.

In a third, most preferred embodiment of the invention shown in FIGS. 4-6, the first platen is designated 14" and the heating means 18". Heating means 18' is defined by a burner 42 including a flame opening 44. A plurality of such burners 42 is shown in FIG. 4 and are integral with the first platen 14' shown therein. The plurality of burners 42 requires a combustion gas supply system 46 communicating combustible gas to the flame opening 44. Natural gas is a suitable combustible gas although other gases are contemplated for use with the herein invention.

In all three of the above-referenced embodiments, the heating means of the second platen 22 is identical to the heating means of the first platen 14.

As illustrated in FIGS. 1-4, the first platen 14, 14', 14 is defined by a plurality of tubes 48, 48", 48" hereinafter collectively referred to as 48. Tubes 48 extend longitudinally with respect to a path of glass sheet travel through the apparatus 10 from the heating furnace 13 to a run-out table 25, shown in FIG. 1.

As shown in FIGS. 5 and 6, each of the tubes 48 of the third preferred embodiment shown in FIG. 4 includes a first chamber 52 communicating quenching gas to the quench openings 20 and also a second chamber 54 communicating combustible gas to the flame opening 44. The first and second chambers 52, 54 of the tubes 48 are positioned adjacent each other such that the first chamber is sided by the second chamber to define each said tube.

During operation of the apparatus 10, as defined by the third preferred embodiment, a preheated glass sheet 12 is indexed thereinto for subsequent bending. Sensor 24 senses the glass sheet 12 temperature and determines what action should follow. If the heated glass sheet 12 is cool, the glass sheet is indexed out of the apparatus 10 and onto run-out table 25 to avoid possible breakage during bending. The glass sheet 12 is at the appropriate temperature for bending, the first platen 14 is deformed and in cooperation with the second platen 22, the glass sheet is bent between the platens. If the bent glass sheet is to be quenched, the glass sheet is immediately quenched after the bending.

As the temperature drops off during the bending, control 26 actuates combustible gas supply 46 to supply combustible gas to burners 42 which define first and second heating means 18 in this preferred embodiment. Through a continuous feedback loop, the burners 42 in conjunction with the sensor 24 and control 26 operate to raise the temperature of the glass sheet 12, as the gas is burned, to maintain the optimal glass bending temperature. With such an arrangement, the desired mechanical characteristics in a bent and tempered glass sheet are more easily attained.

While the best mode for carrying out the invention has been described in detail, those familiar with the art to which this invention relates will recognize various alternative designs and embodiments for practicing the invention as defined by the following claims.

What is claimed is:

1. A glass heating and bending apparatus for receiving a heated glass sheet, the apparatus comprising: a first platen; said first platen being deformable and including an actuator for deforming said platen from a planar shape to a bent shape; said first platen including a first heating means throughout the extent thereof; said first heating means of the first platen being movable therewith during the deformation of the platen; said first heating means providing heat in close proximity to the heated glass sheet during the bending to maintain an optimal glass bending temperature; a second platen opposing the first platen in spaced relationship with the glass sheet therebetween; heat being supplied by the heating means to the glass sheet to maintain an optimal bending temperature.

2. Apparatus as in claim 1 further including a sensor for sensing the temperature of the heated glass sheet.

3. Apparatus as in claim 2 wherein said sensor is an infra-red spectrafotometer.

4. Apparatus as in claim 2 further including a controller in communication with said sensor for controlling the operation of said first heating means.

5. Apparatus as on claim 4 wherein said first heating means is integral with said first platen.

6. Apparatus as on claim 5 wherein said first heating means is located less than one inch from the surface of the glass sheet being heated.

7. Apparatus as in claim 1 wherein said second platen includes a second heating means for heating the glass sheet.

8. Apparatus as in claim 7 further including a sensor for sensing the temperature of the heated glass sheet prior to the bending.

9. Apparatus is in claim 8 wherein said sensor is an infra-red spectrafotometer.

10. Apparatus as in claim 8 further including a controller in communication with said sensor for controlling the operation of said first and second heating means.

11. Apparatus as in claim 8 wherein said second heating means is arranged on said second platen so as to be located less than one inch from the surface of the glass sheet being heated.

12. Apparatus as in claim 1 wherein said heating means is an electrical resistance heating element.

13. Apparatus as in claim 1 wherein said heating means is a heat pipe.

14. Apparatus as in claim 1 wherein said heating means is a flame burner.

15. Apparatus as in claim 14 further including a combustible gas supply means for supplying combustible gas to said burner.

16. Apparatus as in claim 14 wherein said first platen is comprised of a plurality of tubes extending longitudinally with respect to a path of glass sheet travel.

17. Apparatus as in claim 16 wherein each of said tubes includes a chamber communicating combustible gas to said burner and being integral therewith.

18. A glass heating and bending apparatus for receiving a heated glass sheet, the apparatus comprising: a first lower platen; said first platen being deformable and including an actuator for deforming said platen from a planar shape to a bent shape; said first lower platen being defined by a plurality of tubes extending longitudinally with respect to a path of glass sheet travel; said first lower platen tubes including a burner throughout the extent thereof; said burner being movable therewith during the deformation of the platen; said burner providing heat in close proximity to the heated glass sheet during the bending to maintain an optimal glass bending temperature; a second upper platen defined by a plurality of tubes extending longitudinally with respect to the path of glass sheet travel; said second upper platen opposing the first upper platen in spaced relationship with the glass sheet therebetween; said second upper platen opposing the first lower platen in spaced relationship with the glass sheet therebetween.

19. A glass heating and bending apparatus for receiving a heated glass sheet, the apparatus comprising: a first lower platen; said first platen being deformable and including an actuator for deforming said platen from a planar shape to a bent shape; said first lower platen being defined by a plurality of tubes extending longitudinally with respect to a path of glass sheet travel; said first lower platen tubes including a burner throughout the extent thereof; said burner of the first lower platen being movable therewith during the deformation of the platen; a second upper platen defined by a plurality of tubes extending longitudinally with respect to the path of glass sheet travel; said second upper platen opposing the first lower platen in spaced relationship with the glass sheet therebetween; said second upper platen tubes including a burner throughout the extent thereof; said burner of the second upper platen being movable therewith during the deformation of the platen; said burners providing heat in close proximity to the heated glass sheet during the bending to maintain an optimal glass bending temperature.

* * * * *